Figure 1:
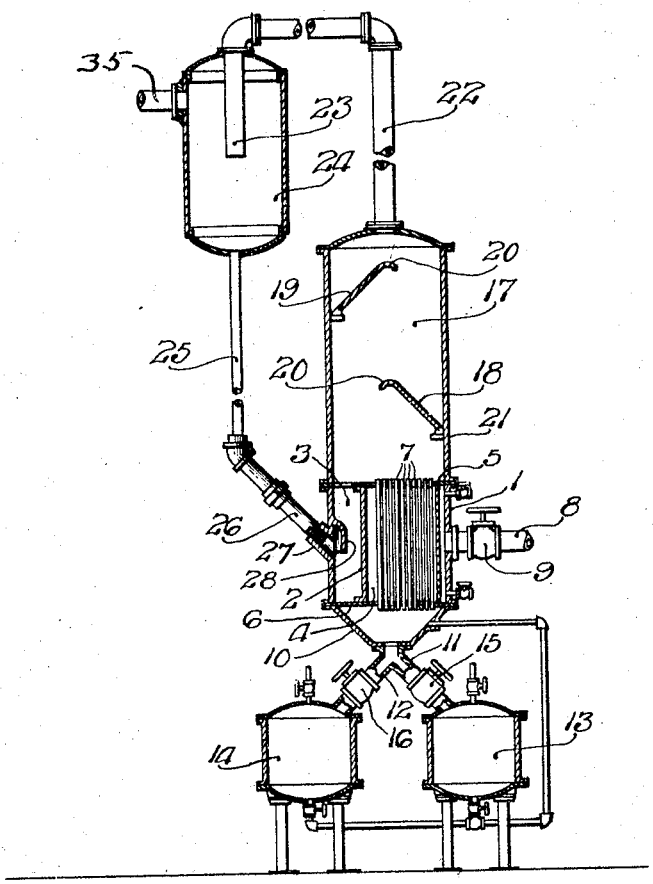

Patented Feb. 3, 1931

1,791,296

UNITED STATES PATENT OFFICE

OSCAR H. WURSTER, OF CHICAGO, ILLINOIS

EVAPORATOR

Original application filed November 22, 1924, Serial No. 751,464. Divided and this application filed May 28, 1927. Serial No. 195,125.

The invention relates to apparatus for evaporating liquids in which crystalline material precipitates during the process and may be utilized, for example, in the evaporation of crude glycerine but is applicable to a large variety of materials as will be readily apparent to those skilled in the art.

The invention is particularly an improvement of the device disclosed in United States Letters Patent No. 1,508,103, issued September 9, 1924, in the name of W. E. Sanger; and has for its object the provision of apparatus of the class described which shall be of improved construction and economical, convenient and efficient in operation.

Another object of the invention is the provision of improved, leak-proof and conveniently accessible connections for exhaust and return pipes.

A further object of the invention is the provision of non-cloggible communication between the several members of the device hereinafter disclosed.

A still further object of the invention is the provision of improved shields for maintaining separate the various materials used.

The invention is exemplified in the combination and arrangement of parts shown in the accompanying drawing and described in the following specification and is more particularly pointed out in the appended claims.

This application is a division of application, Serial No. 751,464, filed November 22, 1924.

In the drawing:—

The figure is a somewhat diagrammatical view with parts in section showing one embodiment of the present invention.

In the embodiment of the invention shown in the drawing a heating chamber or calandria 1 is provided having an upright partition 2 which separates the chamber into two compartments 3 and 4. The chamber 3 is open at the top and bottom, but the chamber 4 is closed by upper and lower heads 5 and 6. Pipes or tubes 7 extend through the heads 5 and 6 making tight connections where they penetrate the heads. The ends of the tubes open outside of the plates forming the heads 5 and 6 so that each tube forms a conduit passing through the chamber 4 and opening into the spaces above and below the chamber. The chamber 3 is entirely open and communicates with the space above and below the heads 5 and 6, respectively. A conduit 8 communicates through the walls of the calandria 1 with the interior of the chamber 4 for the purpose of admitting a heating element or medium, such as superheated steam. A valve 9 is provided for controlling the flow of heating medium to the chamber 4.

Beneath the lower head 6 there is located a hopper-shaped chamber 10 which communicates through pipes 11 and 12 with receptacles 13 and 14, respectively. Valves 15 and 16 are interposed in the pipes 11 and 12. Above the head 5 is a chamber 17 in which there are located baffle plates 18 and 19, the upper edge of the baffle plates being curved outwardly and downwardly, as shown at 20 in Fig. 1. The baffle plates are each provided with openings 21 through which any liquid may drain which might otherwise be entrapped in the pockets above the baffle plates. The chamber 17 communicates through pipes 22 and 23 with a separator 24 so that vapor rising from the chamber 17 will discharge any liquid in suspension therein into the chamber 24 from the bottom of which it will drain through pipe 25 and through the inclined pipe 26 into the calandria 1. It will be seen that the pipe 26 is larger in diameter than the pipe 25 and is inclined at an angle of substantially 45° to the vertical axis of the calandria. The calandria is provided with an inclined boss 27 made integral therewith for receiving the pipe 26 and positioned below the level of the liquid in the chamber 3 of the calandria. It will be seen that as a result of the evaporation and formation of crystals within the evaporator and owing to the rapid circulation and agitation within the evaporator, that some crystals may be deposited in the return pipe 26 at or near the point where it connects with the inclined boss 27. For this reason it is desirable that the pipe 26 be inclined at a steep angle to the calandria 1 and that said pipe be larger than the size required to accommodate the flow of the liquid so that the crystals that may be deposited in the lower pipe will be washed out into said calandria. A small horizontal pipe would permit the formation of a barrier of crystalline material that might in time cut off communication between the separator and the calandria and thus make necessary frequent cleaning of the device, especially when the horizontal pipe is introduced below the level of the liquid in the calandria.

A shield or apron 28 is made integral with the calandria 1 and positioned within the same. The shield forms a protector for the discharge opening at the end of the pipe 26 and prevents the deposition of crystalline matter due to the downward current of liquid and crystalline material in the chamber 3. It will be seen that as the heating medium is introduced into the chamber 4 and around the tubes 7 some of the liquid in the reservoir 10 is vaporized and caused to rise through said tubes carrying therewith many particles of liquid. The entrapped liquid strikes the baffle plates 18 and 19 and is directed downwardly thereby into the compartment 3. The shield 28 being closed on the top and around the edges prevents said liquid and crystalline material from collecting in the boss 27 and the pipe 26.

In operation, the liquid to be treated is introduced through a pipe connection 34 into the chamber 3 and fills the receptacles 14 and 13, the cone-shaped receptacle 10 and the chamber 3 and pipes 7. When the parts are thus filled one of the valves 15 and 16 may be closed and the heating medium admitted through the pipe connection 8. Boiling will occur in the pipes 7 and will occur most vigorously in the tubes nearest the inlet opening for the steam. This will cause vapor to rise from the tubes farthest from the chamber 3 and strike the baffle plate 18. Any liquid rising upward with the rising steam will be projected by the baffle plate 18 and its curved edge 20 downwardly into the open compartment 3. The falling liquid and crystalline matter that is formed will be prevented from collecting in the return pipe 26 or in the boss 27 to which said pipe is connected. The liquid and crystalline matter continues to pass downwardly through the receptacle 10 and eventually into the container 13 or 14, depending upon which valve 15 or 16 has been previously opened. The vapor passes from the chamber 17, through the pipes 22 and 23 into the separator 24 where the remaining liquid is collected and conveyed back to the chamber 3 in the calandria 1. The lower portion of the return pipe being inclined downwardly in the direction of the calandria 1 causes any material that may crystallize therein to pass therethrough and thus prevent clogging of the passage and frequent cleaning of the device. The dry vapor is conveyed through pipe 35 to condensing mechanism, not shown in the drawings.

Obviously those skilled in the art may make various changes in the details and arrangement of parts without departing from the spirit and scope of my invention, as defined by the claims hereto appended, and I desire therefore not to be restricted to the precise construction herein disclosed.

Having thus fully disclosed an embodiment of my invention, what I desire to secure by Letters Patent of the United States is:

1. In an evaporator, the combination with a calandria comprising a cylindrical member having an external boss made integral therewith, the axis of said boss being inclined relative to the axis of said cylindrical member, of a separator for discharging liquid from vapor, an inclined pipe communicating with said calandria through said inclined boss, said pipe also communicating with the interior of said separator, and a shield made integral with the walls of said cylindrical member and arranged over the open end of said pipe for protecting the open end of said pipe and boss.

2. In an evaporator, the combination with a calandria, of an external inclined boss made integral with said calandria and having an opening therethrough communicating with the interior of the same, the axis of said boss being inclined at an angle of substantially forty-five degrees to the axis of said calandria, a pipe having threaded connection with the opening in said boss, and a shield positioned within said calandria adjacent the open end of said pipe and made integral with said calandria for protecting the opening in said boss.

In testimony whereof I have signed my name to this specification on this 19th day of May, A. D. 1927.

OSCAR H. WURSTER.